Jan. 14, 1964 G. MARTENS ET AL 3,118,056

MAGNETIC CORE MATRIX ACCUMULATOR

Filed Aug. 1, 1957 7 Sheets-Sheet 1

INVENTORS
Günther Martens and Gerhard Wolf
BY
Michael S. Striker
Attorney

INVENTORS
Günther Martens and
Gerhard Wolf
BY
Michael S. Striker
Attorney

INVENTORS
Günther Martens and
Gerhard Wolf
BY
Michael S. Striker
Attorney

INVENTORS
Günther Martens and Gerhard Wolf
BY
Michael S. Striker
Attorney

Jan. 14, 1964 G. MARTENS ETAL 3,118,056

MAGNETIC CORE MATRIX ACCUMULATOR

Filed Aug. 1, 1957 7 Sheets-Sheet 5

INVENTORS
Günther Martens and
BY Gerhard Wolf
Michael S. Striker
Attorney

INVENTORS
Günther Martens and
BY Gerhard Wolf
Michael S. Striker
Attorney

INVENTORS
Günther Martens and
Gerhard Wolf
BY
Michael S. Striker
Attorney

United States Patent Office 3,118,056

Patented Jan. 14, 1964

3,118,056

MAGNETIC CORE MATRIX ACCUMULATOR

Gunther Martens, Schliersee, Upper Bavaria, and Gerhard Wolf, Munich-Pasing, Germany, assignors to Kienzle Apparate G.m.b.H., Villingen, Black Forest, Germany Filed Aug. 1, 1957, Ser. No. 675,640
Claims priority, application Germany Aug. 2, 1956
12 Claims. (Cl. 235—160)

The present invention relates to a matrix for registering information, and more particularly to a matrix composed of register elements which are connected along at least two systems of coordinates. The register elements are adapted to store information, and to transfer such information to other register elements located in the same lines or columns.

A matrix according to the present invention is used with particular advantage as an accumulator in electronic computers.

In electronic computers according to the known art, totalizers are employed which contain in each order trigger circuits in which a change in the order value corresponding to the shifting of a decimal point is very complicated. In the event that multi-order results are stored in several trigger circuits in adjacent order positions, an intermediate storing is necessary for obtaining an inner shifting of decimal orders from one order to another order. In the event that no inner shifting of the order is possible in the accumulator, the decimal order must be controlled by additional devices which is only economical for very large computers.

It is the object of the present invention to overcome the disadvantages of accumulators according to the prior art, and to provide an accumulator in which a shifting of decimal orders can be carried out without difficulty.

It is another object of the present invention to provide a matrix device capable of simultaneously performing computing, storing and decimal order shifting operations.

The matrix according to the present invention is composed of register elements which are arranged and connected to form lines and columns of the matrix, with the lines and columns intersecting at register elements. Each register element is shiftable between two conditions, one condition representing registered information. The condition of each register element can be transferred along lines and columns, and a transfer of information in three directions is necessary for carrying out addition, subtraction and shifting of the decimal order values. In accordance with the present invention, the registers formed by register elements arranged in the columns perform the adding and subtracting operations, whereas the register elements arranged along lines effect the shifting of the decimal order value. The information stored in the columns may represent digits, and the information stored in the lines of the matrix may represent the order sequence. In the preferred embodiment of the present invention, the register elements arranged along columns and the register elements arranged along lines are connected to form endless closed ring circuits.

In accordance with the present invention information may be transferred in two opposite directions in the column registers for carrying out addition and subtraction.

In accordance with a further development of the present invention, the required auxiliary register elements, or auxiliary storing elements, which are necessary for shifting information from one register element to an adjacent register element, are so arranged that only a minimum number of auxiliary elements is required. In accordance with the present invention auxiliary register elements are only provided between the register elements of one system of coordinates, but are also connected to register elements of adjacent columns so that information may be transferred in zig-zag steps in direction of the other system of coordinates, namely in line directions. In this manner, a great number of auxiliary register elements is saved.

The arrangement of the present invention is particularly advantageous when used as accumulator for computing machines operating directly in the decimal system.

In this event, a multi-order number having $n$ decimal orders is introduced into the matrix of the present invention in such a manner that each column receives the digit of one order, ten register elements being provided in each column of the matrix. A digit $m$ between 0 and 9 is preferably indicated by information stored in the $m$th register element in the respective column. The other 9 register elements of the respective column are inactive and do not store information. Consequently, the digit 0 is indicated by a register element associated with the digit 0 and being in active condition.

Adding or subtracting operations correspond to the shifting of the active condition of the register elements storing information in one of two opposite directions along columns. A shifting of the order value corresponds to a shifting of the active conditions of the register elements in direction of the lines from one column into another column.

In accordance with the present invention, the shifting of information along columns during computing takes place independently, whereas the shifting of information in line direction is carried out for the entire stored information simultaneously for changing the order value of the entire number.

In accordance with another feature of the present invention, the means by which information is shifted are connected within the matrix in a direction different from the transfer direction. For example, stepping impulses for shifting information in line direction pass along conductors which are aligned with the columns. The advantage of this arrangement of the present invention will appear from the following considerations:

In each column, only a single register element is in active condition storing a bit of information. Each line may contain a plurality of register elements in active conditions storing information. In the event of storing number 999999999999, the line associated with the digit 9, which is the tenth line including zero, contains twelve register elements in active condition storing information. All other lines contain no information. Each column, however, necessarily contains one register element in active condition storing information, in the present case the register element associated with the digit 9 is in active condition in each column.

The energy by which the transfer is carried out, is of a magnitude depending on the number of register elements which have to be simultaneously operated for transferring information. This is evidently also true for the transfer of information in shiftable registers consisting of magnetic storage chains.

Due to this reason, in accordance with the present invention, all stepping impulses are consolidated along columns in the matrix, even in the event that the information is shifted in line direction as is for example required for changing the order value.

In accordance with another aspect of the present invention, the matrix is connected to have computing registers in a number of columns, whereas the other registers arranged along columns will not perform computing functions and need not be designed for this purpose.

The matrix must have as least as many columns as the stored number has orders. In accordance with the organization of the computer, the number of orders which is simultaneously introduced into the accumulator may vary.

In a parallel computer, the results are introduced simultaneously in all orders. In the serial computers, only the value of one order is introduced at one time. In multiplications of single order numbers, the result can have only two orders so that the registers of two columns are sufficient for storing the results in the accumulator.

The number of registers performing totalizer functions in the accumulator is in accordance with another aspect of the present invention adapted to the number of simultaneously introduced computed orders. The respective column registers are permanently associated with the respective outputs of the computer and connected to the same. This arrangement is only a specific application of the matrix of the present invention and has the particular advantage that a great part of the matrix can be constructed in the form of registers which do not perform computing functions but only storing functions, and consequently are less expensive.

The introducing of values into a selected group of column registers necessitates that the introduction has to be carried out under the assumption of variable order values and shiftable decimal points, with respect to the columns of the matrix. From this follows that the order value of the computing columns is variable, and that consequently the order values of the columns in their entirety should be variable by very simple means. This is, however, a particular feature of the present invention as will be described hereinafter.

As regards the decimal order shifting in line direction, a specific arrangement has been found to be particularly advantageous. In accordance with one arrangement of the present invention, the transfer of information for the purpose of changing the order value, is carried out only in one direction. It is self-evident that information could be shifted in line direction in two opposite directions, that is to the right and to the left. It is however preferred to provide only one direction of transfer for this purpose since by this arrangement a particularly simple manner of introducing tens-transfer into the column register can be obtained. Each tens-transfer occurring in a column is advantageously stored in an auxiliary storing element, and would be ordinarily added in the next higher decimal order, that is the next higher column register after the computing of a part result has been completed.

In accordance with this feature of the present invention, the decimal order shifting, that is the shifting of information in line direction from column to column is carried out only in the direction permitting that the tens-transfer values can be immediately reintroduced into their own columns after shifting of the decimal order values. The direction of the shifting of the decimal order values in direction of the lines, consequently is carried out in such a manner that by each shifting step, the order value of each column is increased for one order. This very simple arrangement for shifting of decimal order values in the matrix of the present invention is particularly important because great flexibility in the representation of orders by the column registers is very advantageous.

During each part of the computing operation, that is every time a part result is introduced, part results of different order values are introduced into the same group of computing column registers from the computer. Consequently, the order value of the respective operating column register varies and is different during each part computation. Between two part computations, it is necessary that the order value is quickly and conveniently changed so that the newly introduced part results are registered in accordance with their order value. In the same manner, tens-transfers must be reintroduced to their own column registers as pointed out above.

If the direction, and the circling respectively, of the shifting of the order value is carried out in such a manner that the computing column registers receive during successive computing operations consecutive informations of increased decimal order value, it follows that negative decimal order shifting in the direction of decreased decimal orders, can be represented by $n-m$ steps in positive circling transfer direction, if $n$ is the total number of columns of the matrix, and $m$ the number of steps to be carried out in the direction of decreased order value.

This arrangement requires computing of numbers starting with the lowest order when a multiplication is carried out. For the computing of tens-transfer after termination of the part operations, it is advantageous to compute the multiplicand in a sequence starting from the lowest order, and to compute the multiplier in the reverse sequence. In the event that the multiplicand is introduced into the computer by manual operation of a keyboard in the normal decimal order sequence, the multiplicand must be stored before the computing operation is started. The stored multiplicand is then computed in an order sequence which is reversed with respect to its preceding introduction into the accumulator.

In accordance with a preferred embodiment of the present invention, the register elements are magnetic ring core storing elements, whose magnetic cores have a rectangular hysteresis loops.

Magnetic register elements at the crossing points of the lines and columns of a matrix are particularly advantageous since magnetic register elements can be constructed symmetrical in all directions, and particulary in four directions of transfer. It is theoretically possible to arrange each register element as a crossing point of three series of registers in a three-dimensional matrix.

For the purposes of the present invention it is necessary to construct the register elements symmetrical with respect to the crossing points so that transfer of information can be carried out in opposite directions with the same, or with similar, means. It is also necessary to decouple the input and output in the different directions of the register so that transfer in undesired directions is not possible at the crossing points.

In accordance with one embodiment of the present invention the shifting of the transfer direction is carried out by means of switching diodes. In accordance with another embodiment of the present invention the shifting of the transfer direction is obtained by a coincidence circuit. For example, the coincidence of stepping impulses with information impulses can be used wherein the information impulses are produced by the stepping impulses in a selected direction. Another embodiment of the present invention employs a differential circuit. A core winding is located in one branch which in accordance with the presence of a positive or negative information, offers a resistance against changing of the magnetic core condition or does not offer such resistance. This may also be considered as production of an opposite voltage impulse in accordance with the magnetic condition of the core. In accordance with a particular feature of the present invention, an additional self-inductance is arranged in the symmetrically arranged branch of the differential circuit. The self-induction is so dimensioned that noise signals caused by an imperfect hysteresis of the magnet core, are compensated in the differential circuit.

Another rule for dimensioning the self-inductance results from the possibility of adjusting the level of response of the self-inductance for distinguishing between useful signals and noise signals.

Even if magnetic register elements are used, the cost of totalizing, accumulating, adding and subtracting, that is of computing column registers, is substantially higher than the cost of column registers which are only used for storing functions. The embodiments of the present invention consequently provide within the matrix groups of computing column registers, and groups of storing column registers. It will be understood that all registers formed along the lines of the matrix must have at least transporting properties for transferring information in line direction.

The output signals can be transmitted in decimal order sequence to output connections respectively associated with digits, or can be transmitted in consecutive stepping impulses respectively associated with digits, and appearing on output connections which are respectively associated with the decimal orders. The first case is present when the entire stored information of the matrix is circled in line direction, corresponding to continuous decimal order shifting, and if the output connections are connected to the register elements of a selected column. In this event, the output connections are associated with the respective digit values of the register elements of a column.

The second possibility for the output of information is obtained by circling the entire stored information of the matrix in column direction, and removing the information from register elements of a selected line. The respective digit informations reach the decoupling register elements at the times of the stepping impulses. In accordance with a further development of the present invention, a total transfer of all information stored in the matrix in direction of the columns can be broken up into transfers in a single column with intermediate shifting in line directions. In this arrangement the information to be transferred successively reach the only transferring column, are there transferred, and are then further transferred to storing registers.

In a similar manner, the arrangement of the present invention also permits a transformation of a result into its complement, if during a total transfer in line direction, the complements are formed in a single column.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
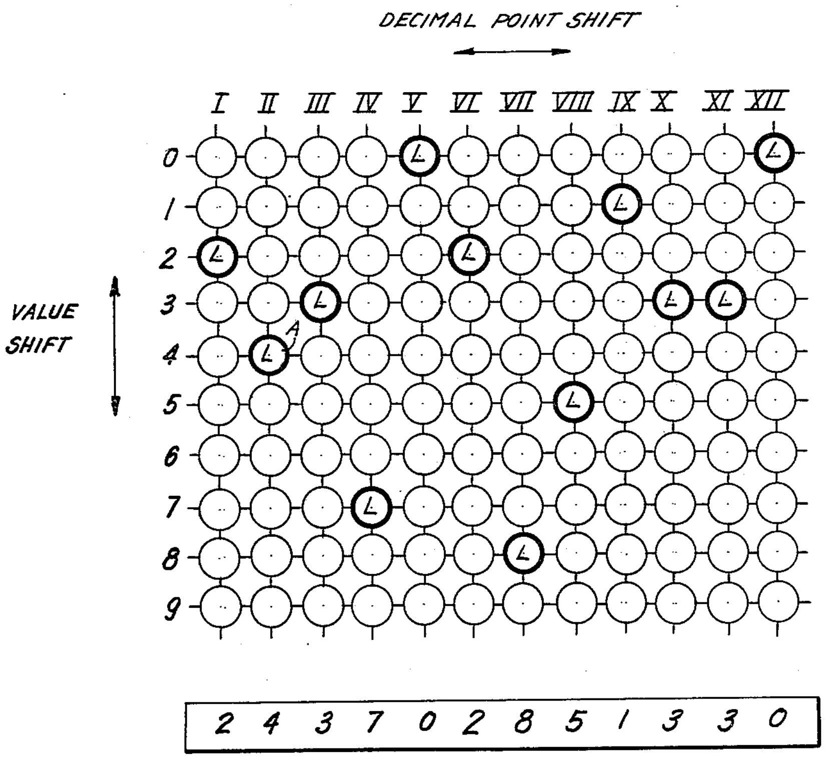
FIG. 1 is a schematic view of a matrix according to the present invention.

Referring now to FIG. 1 which shows a matrix composed of crossing series of shiftable value registers, a set of horizontal registers is provided which are respectively associated with the digits of the orders of a multi-order number, whose orders are respectively represented by the vertical registers.

In the illustrated matrix, 120 register elements are provided which are connected to each other along horizontal and vertical lines to form registers.

The horizontal registers are arranged along lines associated, respectively, with digits 0 to 9, and the vertical registers are arranged along columns I to XII which are respectively associated with orders. The connecting lines shown in FIG. 1 between the register elements schematically illustrate the paths along which information is transferred. In the arrangement shown in FIG. 1, the information can be transferred in any direction along the crossing lines and columns so that a stored information L can be selectively transported from any register element of the matrix passing stepwise along crossing vertical and horizontal lines of the matrix.

It will be noted that the respective register elements are each associated with two registers, namely with a register associated with one order, and with a register associated with one digit of the orders. Consequently, each register element is associated with a line and with a column. The register elements according to the present invention have storing and transporting properties so that information can be stored in each register element and transferred to another register element along the crossing vertical and horizontal lines.

In the event that a matrix according to the present invention is used as an accumulator in a computer, the respective numbers can be represented in any desired manner or code. It is advantageous to apply the decimal system, as shown in FIG. 1, so that a digit is represented by stored information L in register elements associated with the respective digits. For example, the digit 4 in the order II is represented by stored information L in the register element A in line 4 in column II. It will be apparent that this representation of the digits of the multi-order number corresponds to the arrangement of a full keyboard of a calculating machine. The representation of several digits in a plurality of orders takes place in a corresponding manner, as for example shown in FIG. 1 in which the register elements containing stored information are indicated by the character L. FIG. 1 shows the number 243702851330.

In accordance with the above-described representation of the number in the matrix, a simultaneous shifting of all stored information L in direction of the horizontal line corresponds to a shifting of the decimal point, whereas a shifting of the respective stored information in direction of the vertical lines or columns will result in a changing of the numerical value of the number. Consequently, the registers arranged in columns I–XII have a computing function (adding or subtracting), the shifting of stored information along the lines having the function of decades changing (decimal point shift) i.e. multiplication or division by 10 depending upon the direction of the shift.

In other words, the register elements arranged along the lines 0–9 effect shifting of the order value and of the decimal point, whereas the register elements associated with the columns perform the computing functions, such as addition or subtraction.

Figure 2:
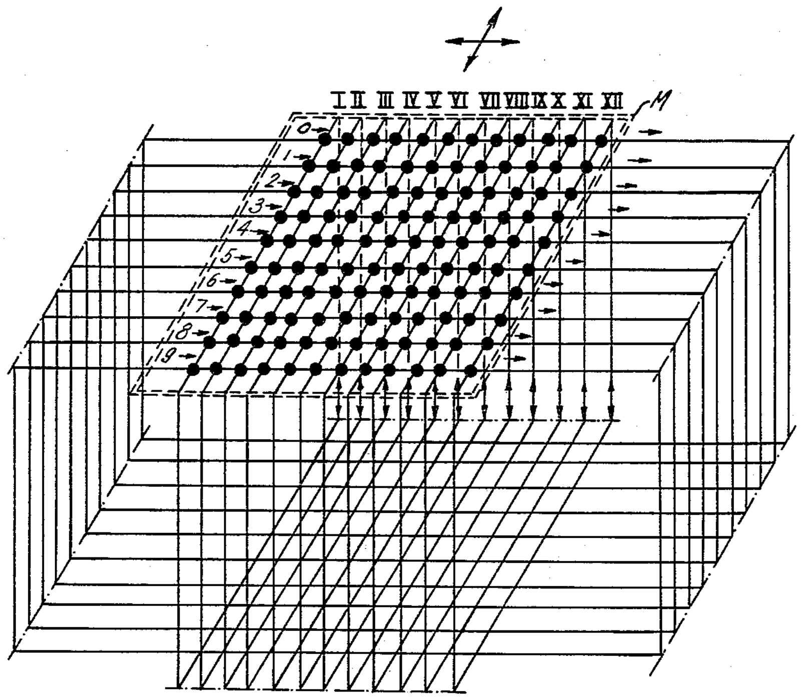
FIG. 2 is a perspective view of a matrix according to the present invention composed of closed ring circuits.

In the event that the respective registers, namely the registers extending along the horizontal lines and the registers extending along the vertical columns are respectively connected in ring circuits, a matrix consisting of crossing endless continuous registers results as shown in FIG. 2 in which stored information can be circulated as desired in direction of the lines, or of the columns, as desired. By simultaneous operation and actuation of all endless continuous ring digit registers of the lines 0–9, a circling of a multi-order number stored in the matrix M results, each digit subsequently passing through each column. By individual selected operation of the continuous endless order registers of the columns I–XII, computing operations, such as addition and subtraction, can be carried out. The problem of the tens-transfer will be discussed hereinafter.

Figure 3:
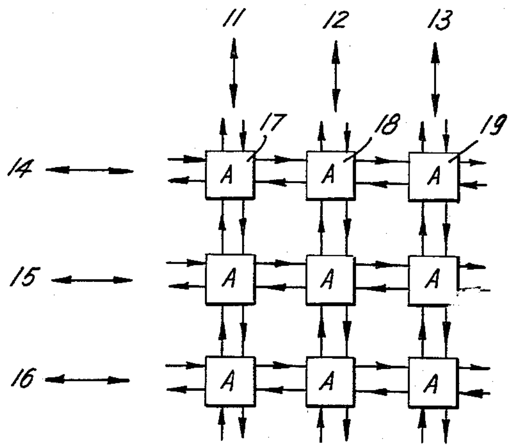
FIG. 3 is a schematic view illustrating a detail of a matrix according to the present invention.

FIG. 3 illustrates a detail of a matrix and shows nine interconnected register elements A. It will be understood that similar register elements may be added in all directions for completing a matrix. The connecting arrows between the register elements A indicate the directions in which the information can be transferred. The direction of transfer can be freely selected at the crossing points of the order registers and digit registers. The arrangement illustrated in FIG. 3 permits a transfer of information along first lines 14, 15 and 16 and second transverse lines 11, 12 and 13 and in opposite directions along each of the above-mentioned lines.

However, it is not possible to simultaneously shift two items of information which are stored in adjacent register elements, for example in register elements 17 and 18. If, for example, information is to be transferred from register element 17 to register element 18 and information is to be transferred from register element 18 to register element 19, it is first necessary to free register element 18 of its previous information before it is capable to receive the information transferred from register element 17.

It will be understood that information is stored in any one of the above-described register elements by placing the respective elements in a storing condition, whereas the register elements which do not contain information are in an inactive condition. The storing conditions may correspond to one conductive condition, and the inactive condition may correspond to a different conductive condition. In any event, each register element is shiftable between two different conditions respectively representing stored information, or no information.

It has been assumed that the register elements are provided with means permitting a control of the direction of movement of the information at the crossing points of the registers. Such control of the directional movement can be effected either by anti-coincidence circuits or by coincidence circuits. In the event that coincidence circuits are applied, information can be more freely transferred so that the coincidence circuit arrangements are preferred. Circuits of this type are more fully explained in the co-pending applications No. 643,078 and 666,096.

All kinds of register elements may be used for forming the registers and the matrix. For example, flip-flop circuits using tubes or transistors, glow-discharge tubes, and magnetizable elements may be used. Since the matrix according to the present invention is particularly advantageous if constructed out of magnetic register elements, several embodiments of the present invention employing magnetic register elements will now be explained.

Figure 4:
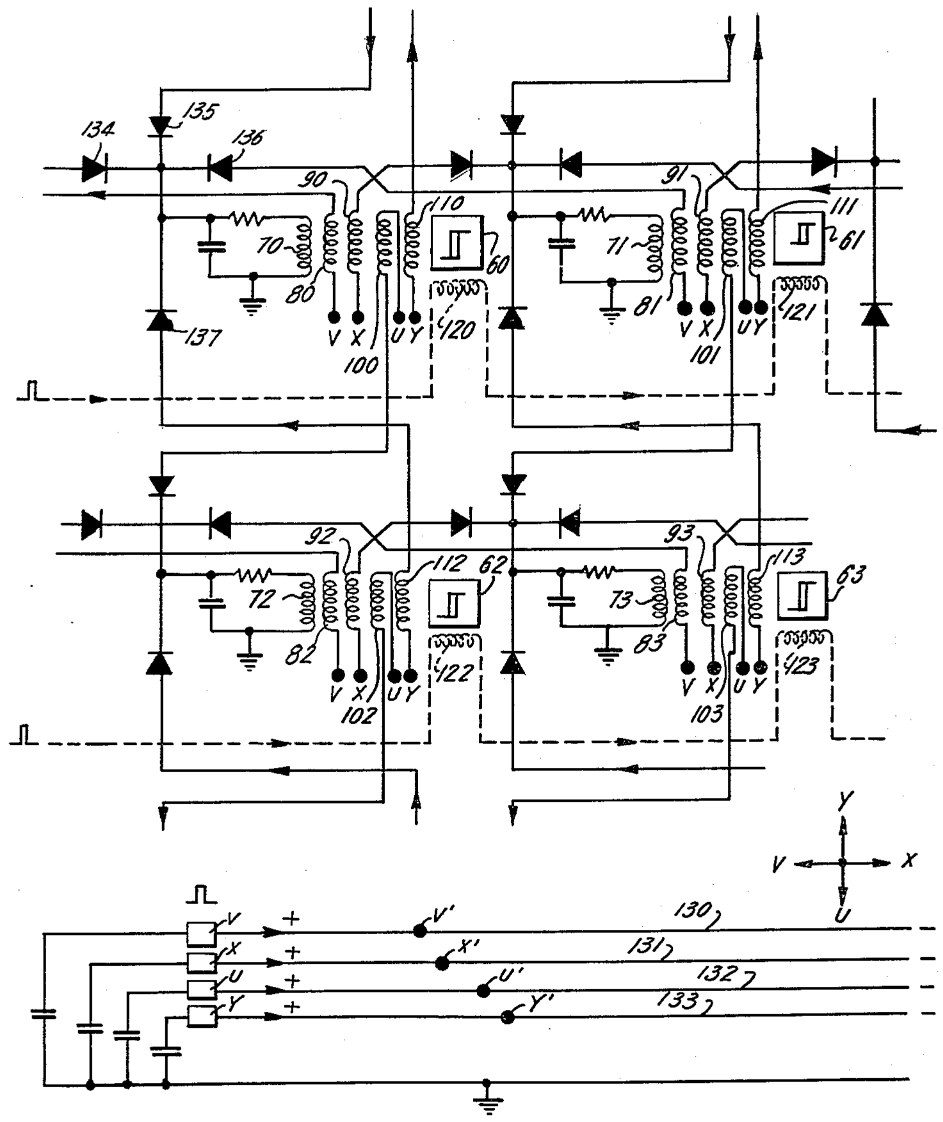
FIG. 4 is a diagram illustrating a circuit connecting the register elements in a matrix according to the present invention.

FIG. 4 illustrates an arrangement according to the present invention in which crossing registers consisting of magnetic register elements are employed. Capacitive auxiliary storing elements are provided, and consequently auxiliary register elements are not necessary so that the matrix is arranged substantially in accordance with the construction shown in FIG. 3.

The magnet cores 60, 61, 62 and 63 have rectangular hysteresis loops. Input windings 70, 71, 72 and 73 are respectively associated with each magnet core. Furthermore, each magnet core has four output windings marked, respectively, 80—113, which effect the transmission of signals for the directions $x$, $y$, $u$, $v$ as indicated by the four-arrow diagram. Each magnet core also carries a control winding (stepping impulse winding) 120, 121, 122, and 123, respectively.

The ends of the windings 80—113 are connected at points $w'$, $v'$, $x'$ and $y'$ to the bus bars 130, 131, 132, 133 respectively. The bus bars have a negative bias voltage so that all diode paths illustrated in FIG. 4 for example at 134, 135, 136 and 137, are blocked. For transfer of an information, unblocking of one of the diode paths is necessary which can be obtained either by disconnecting the negative bias voltage, or by a positive impulse voltage from an impulse generator V, X, U or Y, which is opposite in polarity to the negative bias voltage and superimposed on the same. The impulse generators act at the moment of transfer of information on one of the bus bars 130—133, simultaneously with the application of a stepping impulse to the corresponding control winding 120 etc.

Corresponding to that bus bar 130, 131, 132 or 133 which is energized by the positive coincidence impulse which has to be given simultaneously with the stepping impulse, a transfer of the information in one selected direction of the four possible directions is carried out.

This circuit admits of coupling several systems of coordinates without relative interference, and is consequently suitable for the construction of a matrix according to the present invention.

In the arrangement shown in FIGS. 1 and 2, the horizontal line registers perform the shifting of the decimal point, and the column registers perform addition and subtraction. For carrying out addition and subtraction, it is necessary that the column registers can transfer in two opposite directions, so that e.g. an arrangement as described with reference to FIG. 4 is required. For the registers which effect the shifting of the decimal point, it is only necessary that transfer is carried out in one direction.

Consequently, it is necessary to provide for an accumulator as shown in FIG. 2 register elements capable of transferring information in at least three different directions, considering that addition, subtraction and shifting of decimal points are required. Auxiliary intermediate elements, such as auxiliary register elements, or automatically discharging storing elements, are not considered at the present time.

In accordance with FIG. 2, all register elements of the matrix M are constructed in the same manner so that computing operations can be simultaneously performed in all columns. How many columns are simultaneously used for the computing operation, depends on the number of orders of the computed numbers. In the event that the maximum order number of the computed numbers is limited, the number of columns in which information is transferred in opposite directions, can be limited to a number corresponding to the maximum number of orders of the computed numbers.

In view of the above, a matrix can be designed with a number of columns of registers which serve for the computing operation, and with a number of additional columns of registers whose register elements have only a storing capacity in column direction and permit only transfer of information in one direction namely transversely in direction of lines for shifting the decimal point.

Figure 5:
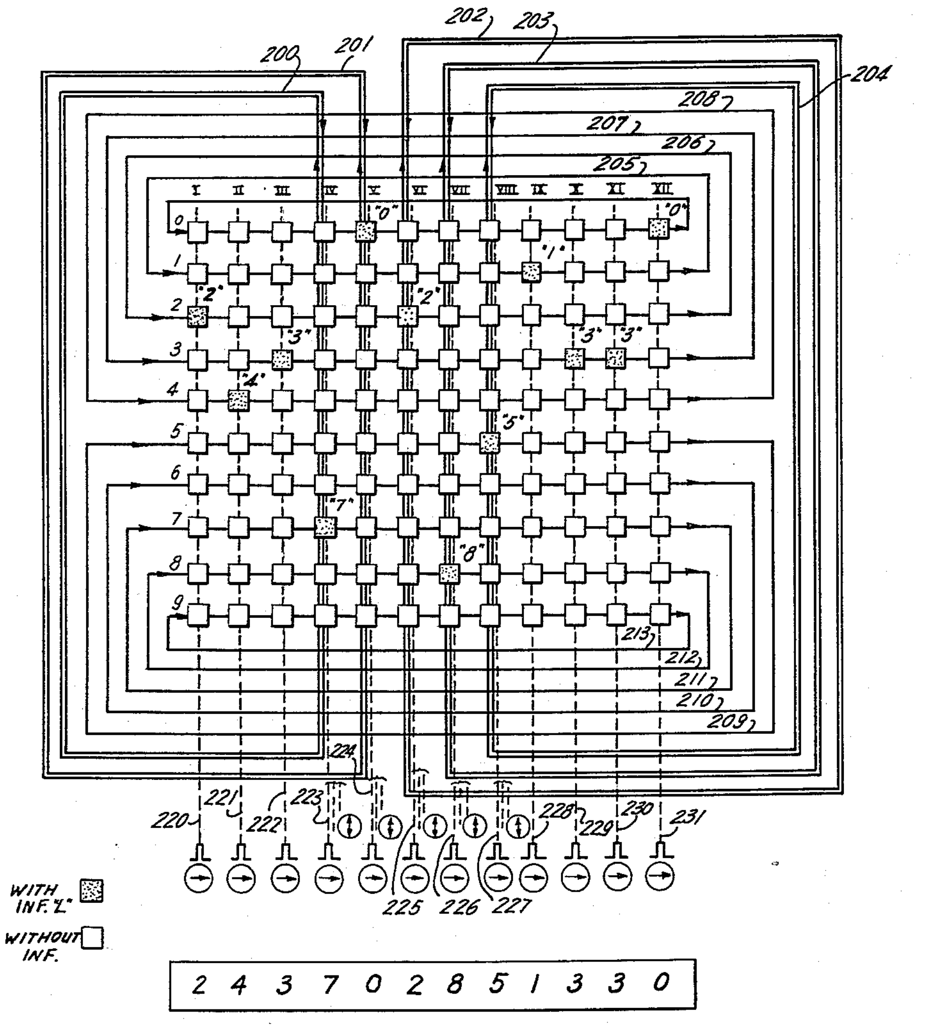
FIG. 5 is a diagram illustrating an accumulator in accordance with the present invention.

FIG. 5 illustrates in diagrammatic form an accumulator operating in accordance with this principle. The matrix has twelve columns, of which five columns IV—VIII are used for addition and subtraction. The connections 200, 201, 202, 203 and 204, shown in double lines, designate the paths along which information can pass in opposite directions in the computing columns IV—VIII.

The connections 205—214 shown in solid single lines, designate the path of information when the decimal point is shifted. The connections shown in broken lines represent in FIG. 5, and in the following figures, the circuit of the stepping impulse generators. The generators are connected with the register elements in column direction. The circuitry of the stepping impulse connections 220—231 for shifting of the decimal point, extends in the arrangement of FIG. 5 transverse to the spatial path used for the shifting the order position of the information. The reason for this type of connection will not be immediately apparent, and is caused by the fact that there is always a certain energy per information L required for moving each digit information.

In the event that the stepping impulse windings of the circuits for shifting the decimal point were connected along the same lines as the transfer movement of the information, the energy required would depend on the unpredictable nature of the information, namely how many bits of information are stored at a given moment in a line register. The maximum number of the digit representing bits of information which can be stored in a single line, corresponds to the number of decimal orders or of register elements therein. However, if the stepping impulse windings for the decimal point shifting are connected in direction of the individual columns, while maintaining unchanged the direction of movement of the information in direction of the lines for shifting of the decimal point, the advantage results that only a single bit of information which has to be transferred in horizontal direction stored in each column is to be shifted by one respective shifting impulse to the next column, so that the energy per column required for the transfer remains constant. In order to better illustrate the conditions for distributing the information, the same number 243702851330 is shown stored in the accumulator of FIG. 5 as in the matrix of FIG. 1.

This particular arrangement is caused by the manner of representing the multi-order numbers. Due to the fact that the wiring of the stepping impulse connections is arranged in column directions aligned with the paths of the information, all circuits of the stepping impulses are shown as arranged in direction of the columns.

Figure 6:
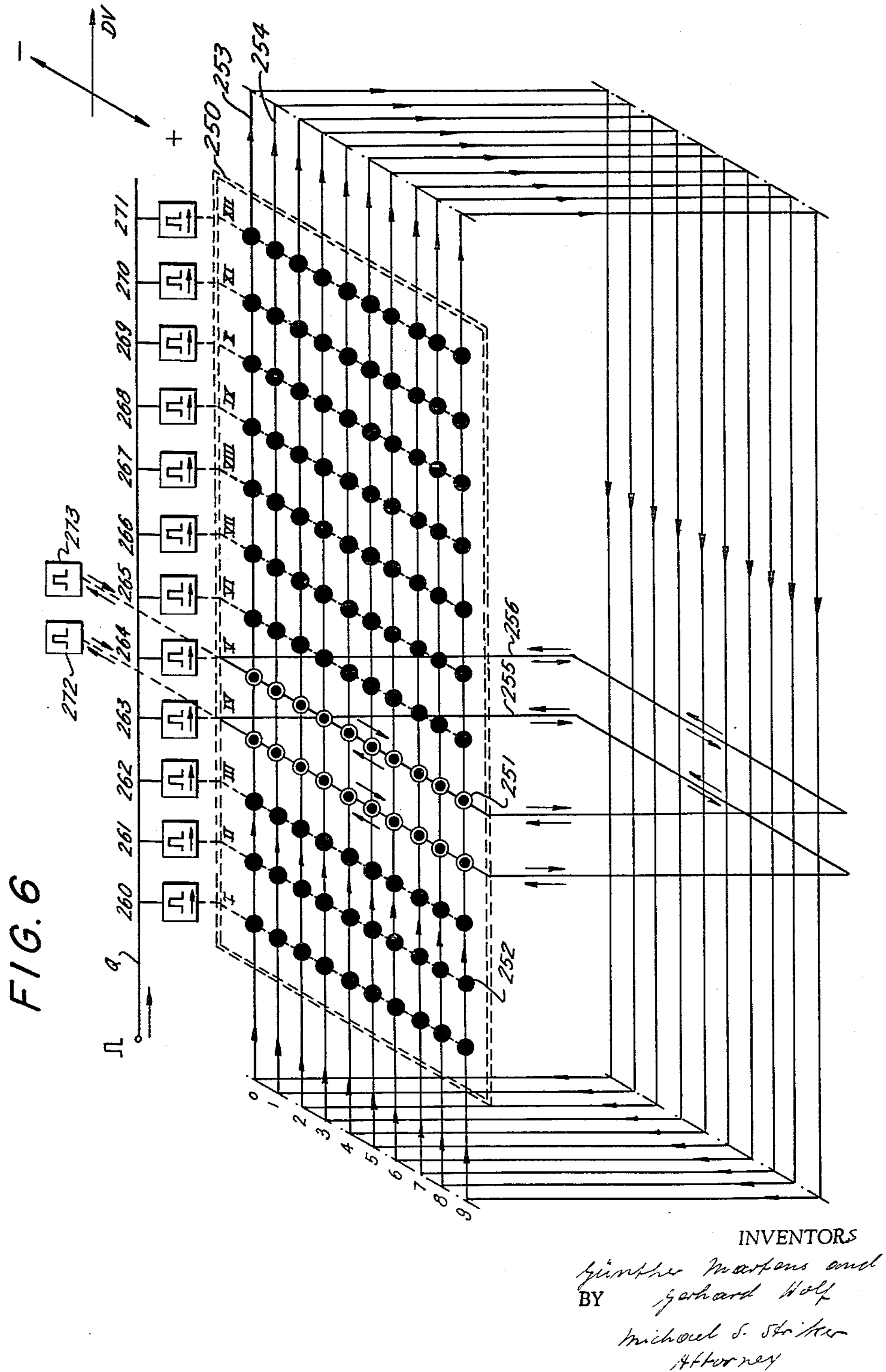
FIG. 6 is a perspective view illustrating a modified accumulator according to the present invention employing only two computing column registers.

FIG. 6 illustrates an arrangement similar to the accumulator of FIG. 5, and shows a matrix for ten different digits and twelve decimal orders. Only two of the columns are used for computing operations. Only the minimum number of column registers required for carrying out addition or subtraction and constructed for transferring information in opposite directions, are provided, resulting in a more economical structure. All other register elements, which do not have to perform computing functions, are constructed in a simplified manner, and are capable only of transferring information in one direction in the direction of the lines, while being capable of storing information in the remaining column registers. This arrangement is preferred, if mainly part products of a multiplication having only two orders, are computed in the accumulator.

The entire matrix 250 is built of register elements 251 capable of transferring information in three directions, and register elements 252 capable of transferring only in one direction. All registers of the lines are closed by the ring conductors 253, 254 and so forth to be endless rings. The ring connections of the column registers are only provided for the computing columns in the form of circuits 255, 256. The columns in which no computing takes place, and which have no possibility of transfer in column direction and which perform only storing functions, are not provided with ring connections.

The stepping impulse generators 260—271 serve for causing the transfer of digit information in direction of the lines, while the stepping impulse generators 272 and 273 are used for shifting the information in column direction as a function of the computing operation. In accordance with their function, the generators for the digit or decimal point shifting 260—271 are always simultaneously excited via a common line Q so that information, i.e. digits, are simultaneously transferred between various columns. The connection of the stepping impulse windings for the decimal point shifting is again arranged in column direction. The column stepping impulse generators 272 and 273, which, for example, are twin generators for forward and rearward transfer movement, are in accordance with their purpose of introducing numbers to be computed, always operated independently of each other. During this operation, an information stored in any one column IV or V is shifted for so many steps as required to represent the digits of the respective orders of the introduced number in the respective column.

By a first shifting the decimal point of stored digits in line direction, the order value of the numbers stored in the various columns can be adjusted to the order value of the numbers to be introduced into the matrix.

It is a characteristic feature of the present invention, that always the same computing column registers are used for introduced numbers which are to be added or subtracted, and that a distribution in accordance with the correct value of the orders is obtained by a corresponding circling shifting of the orders of the entire information stored in the matrix.

By a shifting of the decimal points through one step, the order value of all columns is changed one decimal position. During a sequence of decimal shifting steps, the respective columns pass step-by-step through different order values, and preferably in a direction in which the order value is increased. The order value of a column is always determined by the order value of the digit stored therein.

If a computing operation is to be carried out in a selected decimal order of the information stored in the matrix, then the latter is shifted step-by-step until the decimal order value of the computing column corresponds to the decimal order value of the information (digit) stored therein, and also corresponds to the decimal order value of the newly introduced number. Since a tens-transfer must be considered, the direction of circling for the decimal point shifting is preferably selected in such a manner that the decimal order value of the computing columns increases in stepwise succession during a sequence of computing operations. In the event that this direction of circling is selected, tens-transfers, which may emanate from a register element of a column upon the step otherwise involving the digits 9–0, can be stored in a transfer storing means, and then introduced as a stepping impulse into the same column in which they occurred, after a decimal order shifting for one step has been carried out.

The computing of the tens-transfer amounts from one column is carried out ofter said decimal order shifting by shifting the information L now contained in the adjacent computing column in column direction through as many steps as the amount of such tens-transfers calls for. If after a decimal order shifting, in each computing column only a single order number is introduced, only a single tens-transfer can occur in each column, and consequently a single unit transfer storing device is sufficient.

Frequently the selected direction of circling for the decimal order shifting is contrary to the sequence of introducing the decimal orders of a multi-order number for computing purposes, which starts with the introduction of the decimal orders of highest value, and proceeds in direction of decreasing decimal orders. This corresponds to the keyboard operation of a conventional calculating machine. The circling direction of the decimal order shifting, however, is selected for reasons of a suitable tens-transfer in such a manner that the decimal order value of the computed orders succesively increases. This necessitates the computing of introduced numbers, which for example are temporarily stored in an input storing device, in a sequence of the decimal orders which is opposite to the sequence of the orders during the input operation. Consequently the input storing device should be of a type permitting transfer in any selected sequence of the decimal orders.

If a product has to be formed of two numbers, for example a multiplier and a multiplicand, it is under certain conditions advisable to compute these numbers in opposite sequence of their decimal orders. Consequently, the multiplicand is introduced starting with the lowest decimal order, and the computing operation is continued in direction towards the higher decimal orders, while the multiplying operation is started with the highest decimal order of the multiplier. The problem, caused by the necessary decimal order shifting in direction of decreasing order value which occurs in this kind of operation, is solved in a simple manner by incomplete circling of the result in direction of the decimal order shifting. When the entire matrix is provided with facilities for $n$ decimal orders, a number of $n-m$ decimal order steps results in an order value of the computing column which is $m$ steps lower.

The individual positive decimal order steps are coordinated with single successive part operations, while the shifting in negative direction, which is represented by incomplete circlings, is associated with a prequisite group operation.

Such a group operation is for example present when all digits of the orders of a multiplicand are mutiplied with one digit of an order of an introduced multiplier, and when then a new digit of another order of the multiplier having a lower decimal order value is introduced.

Figure 7:
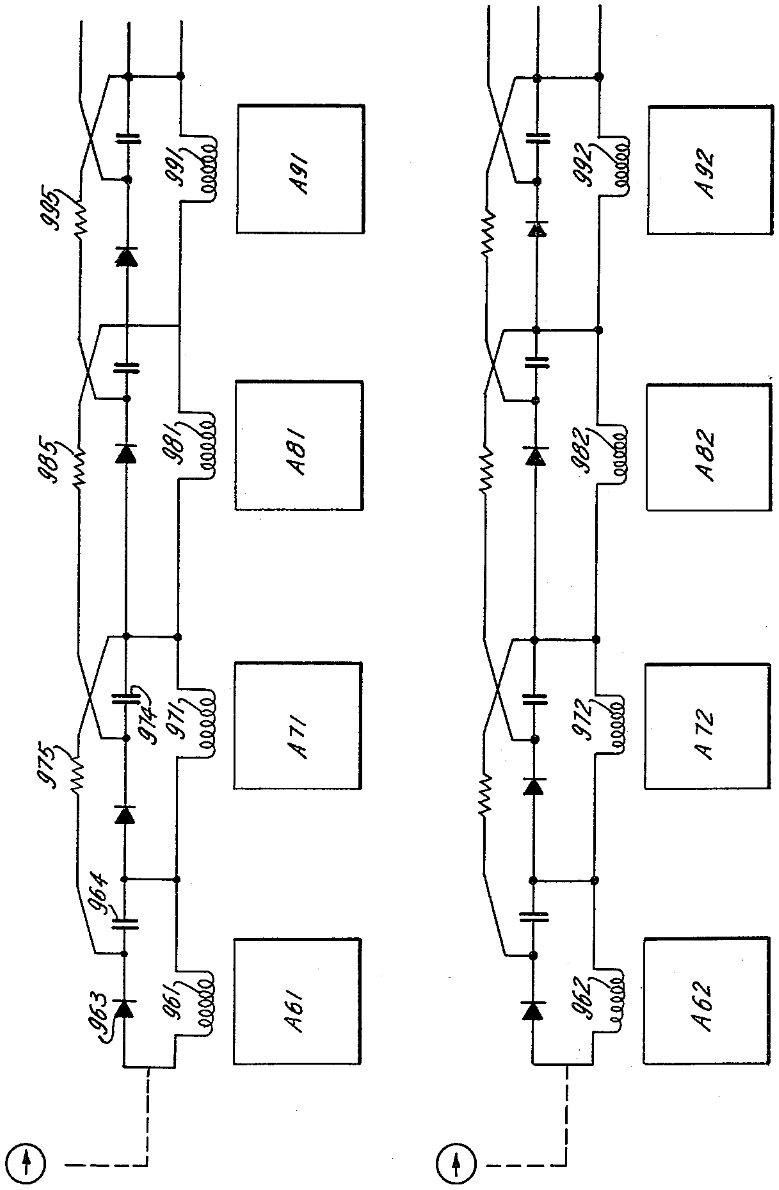
FIG. 7 is a diagram illustrating a detail of a circuit connecting the register elements for transfer in one direction.
Figure 8:
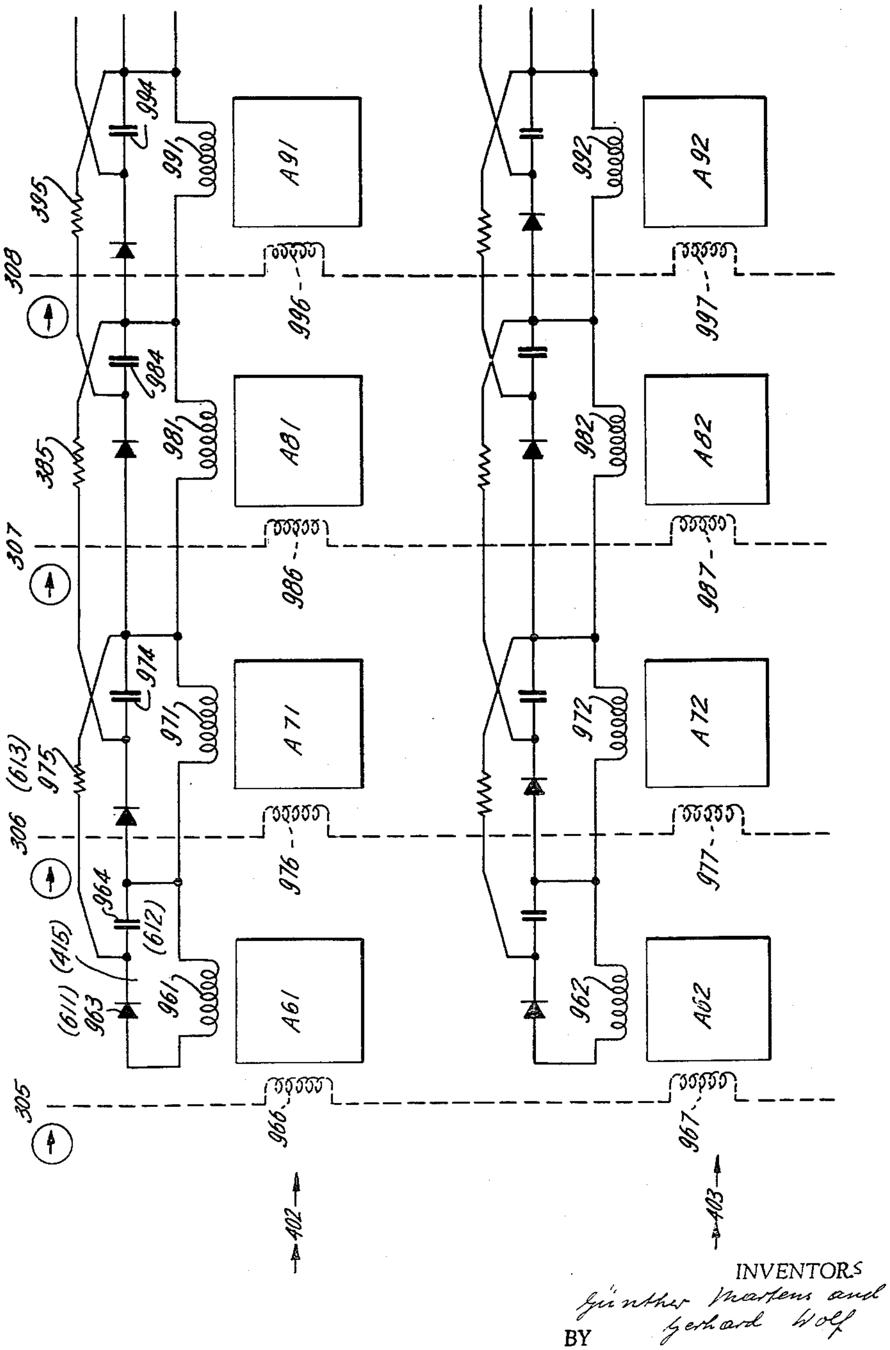
FIG. 8 is a diagram illustrating another circuit of the present invention.

FIGS. 7 and 8 illustrate simplified register elements of non-computing registers. The arrangements shown respectively in FIGS. 7 and 8 are different from each other only regarding the direction of the stepping impulse circuits.

In the arrangement of FIG. 7, the simplified connection of the register elements with only a single winding is applied for transfer of information, a single winding being used not only for the stepping impulse circuit but also for transfer of information. FIG. 7 constitutes a detail of a matrix including the register elements A61—A91 and A62—A92. The windings 961, 971, 981, 991 and 962, 972, 982, and 992, respectively, belong to the magnet cores. These windings for a magnet core having a rectangular hysteresis loop, constitute a dipole which, in accordance with the magnetic condition of the magnet core, which in turn depends on whether or not the magnet core stores an information, has one of two possible conditions of resistance. In the event that the magnet core stores an information, an opposing voltage is formed across the winding of the respective core when a stepping impulse current passes therethrough, which means that the winding offers a resistance against reversal of the magnetic condition of the core by the stepping impulse current. Due to this resistance against reversal of the magnetic condition of the core, the charging of a storing condenser in a circuit parallel to the winding can be controlled. The charging circuit for the winding 961 at the register element A61 consists, for example, of the rectifier 963 and of the condenser 964. The charge of the condenser 964 flows through a resistor 975 and through the winding 971 of the magnet core of register element A71, so that the same is magnetized, and the thus transferred information stored therein. The transfer of information from the resistance 985 through winding 981 to the register A81 takes place in the same manner.

The stepwise transfer of stored informations takes place in direction of the stepping impulse circuit. The voltage necessary for transferring the information depends consequently on the number of the bits or items of information stored in the circuit.

Due to previously explained reasons, a selected number of items of information can be stored in the register element of a line, the maximum number being equal to the number of register elements in the respective line. This means that the voltage required for transfer of information, and correspondingly the required electric energy, depends on accidental and unpredictable conditions in the accumulator, and on the numbers stored therein. Therefore, as an improvement a connection of the stepping impulse circuit transverse to the paths of the information is provided in accordance with the present invention, as previously explained. For example the information moves in line direction, while the stepping impulse circuits are connected in column direction. An arrangement of this type is illustrated in FIG. 8, in which the previously discussed register elements A61—A91, A62—A92 are again illustrated. A transfer of information again takes place through a similar transfer circuit including the transfer windings 961, 971, 981, 991 and 962, 972, 982, 992, respectively. In addition to these transfer windings, separate stepping impulse windings 966, 976, 986, 996, and 967, 977, 987, 997, respectively, are required. These windings effect an inductive coupling of the stepping impulse to the transfer circuits, while otherwise the operation is the same as discussed with reference to FIG. 7.

The output of numbers stored in the matrix into magnetic storage devices or to printing devices can be carried out in two ways:

(1) The entire stored information is circled in direction of the lines by continuous decimal order shifting and decoupled as output signals at the register elements of a selected column, or (2) The information is circled in direction of the columns, and decoupled in the form of the output signals from the register elements of one line.

In the first case, the output signals are received on conductors respectively associated with the digits in a decimal order sequence. In the other case, however, the output signals appear at the output of column registers of the respective orders which at the stepping time are associated with cetrain digit values.

These operations will be best understood with reference to FIG. 5. It is assumed that the number shown at the bottom in FIG. 5 is stored in the matrix. If decoupling lines are connected to all elements of the last column, and are connected through intermediate elements with printing magnets, every time when an information signal passes a predetermined element of this column, the respective associated printing magnet is actuated. If a stepwise continued decimal order shifting is carried out, a new information (digit) arrives with each step at one element of the decoupling column. In accordance with the digit value, one or the other decoupling means, and the respective printing magnet are actuated so that the respective digits are successively printed.

If, however, the decoupling means are arranged within a single line, for example in the lowermost line, and if all information signals are transferred continuously in direction of the columns, the digit information signals arrive at stepping time at the decoupling means which can be associated with the digits. For example, an information signal with the digit value 5 in the line 5 is transferred five further steps so that it arrives at the register element for the digit 9 provided for decoupling. In accordance with the selected direction of movement, the number of steps corresponds to the respective digit stored in a column, or to its complement. If all decimal orders, corresponding to the registers of the columns, are simultaneously shifted, it is possible that all digit values simultaneously appear at the output means which are associated with the respective decimal orders. This is the case if the same digits are stored in all columns of the matrix. This manner of output of digits from the matrix is particularly suited for all mechanical output devices which respond to a sequence of digits simultaneously in all orders and sequentially regarding the digit values.

In a simplified matrix having only two computing column registers, it is of course not possible to effect the circling in column direction simultaneously in all columns. It is, however, possible to break up the shifting of all information in column direction into individual steps, so that in a single computing column, all arriving informations is shifted for a single step, respectively, in direction of column, whereupon a decimal order shifting is interposed. After a complete decadic circling with interposed computing steps (addition or subtraction), the entire information stored in the matrix has been shifted one step, and after $n$ circlings, for $m$ steps. This method of operation can be applied in the same manner as a simultaneous circling of all information in column direction. It is only necessary to assure that the decoupling is always carried out after a circling has been completed.

In the same manner as the total movement of the information in direction of the columns can be broken up into individual movements, it is also possible to carry out the formation of complements in a single computing column register. The computing column register is maintained in circling operation until its information reaches, for example, a register element associated with the digit 0. In the event that before this operation an information representing a certain digit has been introduced into the register element assigned to the digit 0, it is then stored in a register element associated with the complement of said particular digit value with respect to ten.

It will be understood that each of the elements described above, or two or more together, may also find a useful application in other types of computers differing from the types described above.

While the invention has been illustrated and described as embodied in a matrix arrangement including register elements arranged and connected along crossing lines, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a matrix device of the type described for storing and processing digit values of a decimal multi-order number, in combination, a plurality of information storage element means each being operable by energization to change between an active condition representing stored digit information and an inactive condition, and including output means for furnishing an information transfer pulse upon occurrence of such change, said various storage element means being respectively assigned to different data combinations comprising each a digit value and an order position thereof; a first plurality of energy transfer circuit means respectively connecting predetermined first groups of said storage element means serially so as to constitute first registers assigned to different predetermined order positions, respectively, for transferring stepwise said energization transfer pulses from one energized storage element means of any particular first register to other storage element means of the same first register and thereby shifting stored digit information within individual first registers without change of their order position, such shifting constituting an arithmetic operation; input means for selectively applying energization to selected ones of said first registers for storing digit information in a storage element means thereof; a second plurality of energy transfer circuit means respectively connecting predetermined groups of said storage element means serially so as to constitute second registers assigned to different digit values, respectively, for transferring stepwise energization from any desired energized storage element means of any desired particular second register to other storage element means of the same second register and thereby shifting stored digit information within individual second registers so as to change only the respective order position of such stored digit information, each such shifting step constituting a multiplication or a division by the factor 10 depending on the shift direction; a plurality of energization transfer and shift direction control means, each comprising a plurality of diode means respectively interposed between the otuput means of at least a selected number of said storage element means and the respectively consecutive storage element means within said first and second registers thereof, respectively, said diode means normally blocking any transfer of digit information from one to the other of said storage element means, but being adapted to be unblocked selectively by operation of selective unblocking means in coincidence with application of energization to at least one of said registers, the direction of transfer of digit information depending upon which of said diode means are unblocked; energizing means respectively connected to at least one of said registers for applying energization thereto and for thereby causing production of at least one of said information transfer pulses by said output means thereof; and unblocking means for selectively unblocking selected ones of said diode means of said plurality of transfer and shift direction control means, respectively, for thereby determining the desired direction of stepwise transfer of digit information along said first and second registers, respectively.

2. In a matrix device of the type described for storing and processing digit values of a decimal multi-order number, in combination, a plurality of information storage element means each being operable by energization to change between an active condition representing stored digit information and an inactive condition, and including output means for furnishing an information transfer pulse upon occurrence of such change, said various storage element means being respectively assigned to different data combinations comprising each a digit value and an order position thereof; a first plurality of energy transfer circuit means respectively connecting predetermined first groups of said storage element means serially so as to constitute first ring registers assigned to different predetermined order positions, respectively, the first and last storage element means of at least a predetermined number of said first registers being connected with each other, for transferring stepwise said energization transfer pulses from one energized storage element means of any particular first register to other storage element means of the same first register and thereby shifting stored digit information within individual first registers without change of their order position, such shifting constituting an arithmetic operation; input means for selectively applying energization to selected ones of said first registers for storing digit information in a storage element means thereof; a second plurality of energy transfer circuit means respectively connecting predetermined groups of said storage element means serially so as to constitute second registers assigned to different digit values, respectively, for transferring stepwise energization from any desired energized storage element means of any desired particular second register to other storage element means of the same second register and thereby shifting stored digit information within individual second registers so as to change only the respective order position of such stored digit information, each such shifting step constituting a multiplication or a division by the factor 10 depending on the shift direction; a plurality of energization transfer and shift direction control means, each comprising a plurality of diode means respectively interposed between the output means of at least a selected number of said storage element means and the respectively consecutive storage element means within said first and second registers thereof, respectively, said diode means normally blocking any transfer of digit information from one to the other of said storage element means, but being adapted to be unblocked selectively by operation of selective unblocking means in coincidence with application of energization to at least one of said registers, the direction of transfer of digit information depending upon which of said diode means are unblocked; energizing means respectively connected to at least one of said registers for applying energization thereto and for thereby causing production of at least one of said information transfer pulses by said output means thereof; and unblocking means for selectively unblocking selected ones of said diode means of said plurality of transfer and shift direction control means, respectively, for thereby determining the desired direction of stepwise transfer of digit information along said first and second registers, respectively.

3. In a matrix device of the type described for storing and processing digit values of a decimal multi-order number, in combination, a plurality of information storage element means each being operable by energization to change between an active condition representing stored digit information and an inactive condition, and including output means for furnishing an information transfer pulse upon occurrence of such change, said various storage element means being respectively assigned to different data combinations comprising each a digit value and an order position thereof; a first plurality of energy transfer circuit means respectively connecting predetermined first groups of said storage element means serially so as to constitute first ring registers assigned to different predetermined order positions, respectively, the first and last storage element means of at least a predetermined number of said first registers being connected with each other, for transferring stepwise said energization transfer pulses from one energized storage element means of any particular first register to other storage element means of the same first register and thereby shifting stored digit information within individual first registers without change of their order position, such shifting constituting an arithmetic operation; input means for selectively applying energization to selected ones of said first registers for storing digit information in a storage element means thereof; a second plurality of energy transfer circuit means respectively connecting predetermined groups of said storage element means serially so as to constitute second ring registers assigned to different digit values, respectively, the first and last storage element means of at least a predetermined number of said second registers being connected with each other, for transferring stepwise energization from any desired energized storage element means of any desired particular second register to other storage element means of the same second register and thereby shifting stored digit information within individual second registers so as to change only the respective order position of such stored digit information, each such shifting step constituting a multiplication or a division by the factor 10 depending on the shift direction; a plurality of energization transfer and shift direction control means, each comprising a plurality of diode means respectively interposed between the output means of at least a selected number of said storage element means and the respectively consecutive storage element means within said first and second registers thereof, respectively, said diode means normally blocking any transfer of digit information from one to the other of said storage element means, but being adapted to be unblocked selectively by operation of selective unblocking means in coincidence with application of energization to at least one of said registers, the direction of transfer of digit information depending upon which of said diode means are unblocked; energizing means respectively connected to at least one of said registers for applying energization thereto and for thereby causing production of at least one of said information transfer pulses by said output means thereof; and unblocking means for selectively unblocking selected ones of said diode means of said plurality of transfer and shift direction control means, respectively, for thereby determining the desired direction of stepwise transfer of digit information along said first and second registers, respectively.

4. In a matrix device of the type described for storing and processing digit values of a decimal multi-order number, in combination, a plurality of information storage element means each being operable by energization to change between an active condition representing stored digit information and an inactive condition, and including output means for furnishing an information transfer pulse upon occurrence of such change, said various storage element means being respectively assigned to different data combinations comprising each a digit value and an order position thereof, said plurality of storage element means being respectively arranged at the intersections of rows thereof assigned to respectively different digit values and of columns thereof intersecting said rows and assigned to respectively different order positions; a first plurality of energy transfer circuit means respectively connecting predetermined first groups of said storage element means along said columns, respectively, serially so as to constitute first registers assigned to different predetermined order positions, respectively, for transferring stepwise said energization transfer pulses from one energized storage element means of any particular first register to other storage element means of the same first register and thereby shifting stored digit information within individual first registers without change of their order position, such shifting constituting an arithmetic operation; input means for selectively applying energization to selected ones of said first registers for storing digit information in a storage element means thereof; a second plurality of energy transfer circuit means respectively connecting predetermined groups of said storage element means along said rows, respectively, serially so as to constitute second registers assigned to different digit values, respectively, for transferring stepwise energization from any desired energized storage element means of any desired particular second register to other storage element means of the same second register and thereby shifting stored digit information within individual second registers so as to change only the respective order position of such stored digit information, each such shifting step constituting a multiplication or a division by the factor 10 depending on the shift direction; a plurality of energization transfer and shift direction control means, each comprising a plurality of diode means respectively interposed between the output means of at least a selected number of said storage element means and the respectively consecutive storage element means within said first and second registers thereof, respectively, said diode means normally blocking any transfer of digit information from one to the other of said storage element means, but being adapted to be unblocked selectively by operation of selective unblocking means in coincidence with application of energization to at least one of said registers, the direction of transfer of digit information depending upon which of said diode means are unblocked; energizing means respectively connected to at least one of said registers for applying energization thereto and for thereby causing production of at least one of said information transfer pulses by said output means thereof; and unblocking means for selectively unblocking selected ones of said diode means of said plurality of transfer and shift direction control means, respectively, for thereby determining the desired direction of stepwise transfer of digit information along said first and second registers, respectively.

5. In a matrix device of the type described for storing and processing digit values of a decimal multi-order number, in combination, a plurality of information storage element means each being operable by energization to change between an active condition representing stored digit information and an inactive condition, and including output means for furnishing an information transfer pulse upon occurrence of such change, said various storage element means being respectively assigned to different data combinations comprising each a digit value and an order position thereof, said plurality of storage element means being respectively arranged at the intersections of rows thereof assigned to respectively different digit values and of columns thereof intersecting said rows and assigned to respectively different order positions; a first plurality of energy transfer circuit means respectively connecting predetermined first groups of said storage element means along said columns, respectively, serially so as to constitute first ring registers assigned to different predetermined order positions, respectively, the first and last storage element means of at least a predetermined number of said first registers being connected with each other, for transferring stepwise said energization transfer pulses from one energized storage element means of any particular first register to other storage element means of the same first register and thereby shifting stored digit information within individual first registers without change of their order position, such shifting constituting an arithmetic operation; input means for selectively applying energization to selected ones of said first registers for storing digit information in a storage element means thereof; a second plurality of energy transfer circuit means respectively connecting predetermined groups of said storage element means along said rows, respectively, serially so as to constitute second ring registers assigned to different digit values, respectively, for transferring stepwise energization from any desired energized storage element means of any desired particular second register to other storage element means of the same second register and thereby shifting stored digit information within individual second registers so as to change only the respective order position of such stored digit information, each such shifting step constituting a multiplication or a division by the factor 10 depending on the shift direction; a plurality of energization transfer and shift direction control means, each comprising a plurality of diode means respectively interposed between the output means of at least a selected number of said storage element means and the respectively consecutive storage element means within said first and second registers thereof, respectively, said diode means normally blocking any transfer of digit information from one to the other of said storage element means, but being adapted to be unblocked selectively by operation of selective unblocking means in coincidence with application of energization to at least one of said registers, the direction of transfer of digit information depending upon which of said diode means are unblocked; energizing means respectively connected to at least one of said registers for applying energization thereto and for thereby causing production of at least one of said information transfer pulses by said output means thereof; and unblocking means for selectively unblocking selected ones of said diode means of said plurality of transfer and shift direction control means, respectively, for thereby determining the desired direction of stepwise transfer of digit information along said first and second registers, respectively.

6. A device as set forth in claim 1 wherein each of said storage element means includes a magnet core having a rectangular hysteresis loop, and wherein said active and inactive conditions of said storage element means are different magnetic conditions of said magnet cores, and wherein said output means include windings on said cores.

7. A device as set forth in claim 6 wherein said energy transfer means include differential circuit means connecting said windings of said cores, and including a coil producing an additional self-inductance.

8. A device as set forth in claim 7 wherein said coil is dimensioned for compensating noise signals produced by magnet cores having an imperfect rectangular hysteresis loop.

9. A device as set forth in claim 8 and including means for predetermining the inductance of said coil for distinguishing between signals produced by said control means and noise signals.

10. A device as set forth in claim 4 wherein said storage element means include magnet cores having a rectangular hysteresis loop and wherein said active and inactive conditions of the storage element means are two different magnetic conditions of said magnet cores, and wherein said output means include a plurality of windings on said cores of said storage element means associated with said selected columns, and only a single winding on the cores of the storage element means associated with the other columns.

11. A device as claimed in claim 4, having a first plurality of energy transfer circuit means connecting storage element means in only a selected number of said columns, respectively, the storage element means located in other ones of said columns being connected, respectively, only in said second registers, respectively, by said second plurality of energy transfer circuit means.

12. A device as claimed in claim 5, having a first plurality of energy transfer circuit means connecting storage element means in only a selected number of said columns, respectively, the storage element means located in other ones of said columns being connected, respectively, only in said second registers, respectively, by said second plurality of energy transfer circuit means.

References Cited in the file of this patent

UNITED STATES PATENTS

| | | |
|---|---|---|
| 2,652,501 | Wilson | Sept. 15, 1953 |
| 2,654,080 | Browne | Sept. 29, 1953 |
| 2,666,575 | Edwards | Jan. 19, 1954 |
| 2,700,504 | Thomas | Jan. 25, 1955 |
| 2,708,722 | An Wang | May 17, 1955 |
| 2,834,007 | Smith | May 6, 1958 |
| 2,884,621 | Ross | Apr. 28, 1959 |
| 2,886,799 | Crooks | May 12, 1959 |
| 2,911,621 | Crooks | Nov. 3, 1959 |
| 2,952,007 | Meyerhoff et al. | Sept. 6, 1960 |
| 3,055,586 | Davis | Sept. 25, 1962 |

OTHER REFERENCES

Moore School of Engineering, Progress Report No. 2 on the Edvac, University of Pennsylvania (February 1947); note Fig. 17(b). (Copy in Division 23.)

Institute of Advance Study, 2nd Interim Progress Report on the Physical Realization of an Electronic Computing Instrument, Princeton University (July 1947); note Figs. 42 A&B. (Copy in Division 23.)

Institute of Advanced Study, 3rd Interim Progress Report, Princeton University (January 1948); note Fig. C-3-1029. (Copy in Division 23.)

Miles: Saturable-Core Reactors as Digital Computor Elements (June 1949); note Figs. 5 and 8.